(12) United States Patent
Kim et al.

(10) Patent No.: US 12,169,465 B2
(45) Date of Patent: Dec. 17, 2024

(54) PERIPHERAL COMPONENT INTERCONNECT EXPRESS DEVICE AND OPERATING METHOD THEREOF

(71) Applicant: SK hynix Inc., Gyeonggi-do (KR)

(72) Inventors: Ki Sung Kim, Gyeonggi-do (KR); Wun Mo Yang, Gyeonggi-do (KR); Gun Woo Yeon, Gyeonggi-do (KR); Dong Kyu Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 3 days.

(21) Appl. No.: 17/963,755

(22) Filed: Oct. 11, 2022

(65) Prior Publication Data

US 2023/0350824 A1     Nov. 2, 2023

(30) Foreign Application Priority Data

Apr. 27, 2022 (KR) .................. 10-2022-0052091

(51) Int. Cl.
*G06F 1/00* (2006.01)
*G06F 13/28* (2006.01)
*G06F 13/42* (2006.01)

(52) U.S. Cl.
CPC .......... *G06F 13/28* (2013.01); *G06F 13/4221* (2013.01); *G06F 2213/0026* (2013.01)

(58) Field of Classification Search
CPC .................. G06F 13/28; G06F 13/4221; G06F 2213/0026
See application file for complete search history.

(56) References Cited

U.S. PATENT DOCUMENTS

| | | | |
|---|---|---|---|
| 8,188,774 B1 | 5/2012 | Krishnamurthy et al. | |
| 9,047,208 B1* | 6/2015 | Moore | G06F 9/45533 |
| 9,071,256 B1 | 6/2015 | Reiss et al. | |
| 2003/0093594 A1* | 5/2003 | Smith | G06F 13/385 |
| | | | 710/48 |
| 2004/0193869 A1* | 9/2004 | Utsumi | G06F 9/4403 |
| | | | 713/2 |
| 2005/0197824 A1* | 9/2005 | Van Dalen | G06F 8/24 |
| | | | 703/28 |
| 2017/0351439 A1* | 12/2017 | Janik | G06F 12/0246 |

(Continued)

FOREIGN PATENT DOCUMENTS

KR   10-2017-0055983 A   5/2017

OTHER PUBLICATIONS

"NVM Express™ Base Specification", Revision 1.4, Jun. 10, 2019.
"PCI Express® Base Specification Revision 4.0 Version 1.0", PCI Express, Sep. 27, 2017.

*Primary Examiner* — Henry Tsai
*Assistant Examiner* — Kim T Huynh
(74) *Attorney, Agent, or Firm* — IP & T GROUP LLP (57) ABSTRACT

A Peripheral Component Interconnect express (PCIe) device includes a Direct Memory Access (DMA) device including a plurality of functions; and a PCIe interface device for performing communication between a host and the DMA device. The PCIe interface device includes a reset operation controller for, when a plurality of reset signals are received from the host, grouping operations, which are the same as one another among reset operations respectively corresponding to the plurality of reset signals, determining a processing order of the reset operations, and performing the reset operations according to the processing order.

19 Claims, 8 Drawing Sheets

(56) References Cited

U.S. PATENT DOCUMENTS

| | | | |
|---|---|---|---|
| 2019/0384642 A1* | 12/2019 | Bolkhovitin | G06F 3/067 |
| 2022/0382692 A1* | 12/2022 | Jeon | G06F 11/0772 |
| 2022/0398154 A1* | 12/2022 | Frank | G06F 13/28 |
| 2023/0333615 A1* | 10/2023 | Qiang | G06F 1/26 |

* cited by examiner

PERIPHERAL COMPONENT INTERCONNECT EXPRESS DEVICE AND OPERATING METHOD THEREOF

CROSS-REFERENCE TO RELATED APPLICATION

The present application claims priority under 35 U.S.C. § 119 (a) to Korean patent application number 10-2022-0052091 filed on Apr. 27, 2022, the entire disclosure of which is incorporated by reference herein.

BACKGROUND

Field of Invention

The present disclosure generally relates to an electronic device, and more particularly, to a Peripheral Component Interconnect express (PCIe) device including a Direct Memory Access (DMA) device and a PCIe interface device.

DESCRIPTION OF RELATED ART

Peripheral component interconnect (PCI) defines a bus protocol used to connect input/output devices to a host device. PCI express (PCIe) is used to define a physical communication layer as a high speed serial interface while having a programming concept defined in the PCI standard.

A storage device is a device which stores data under the control of a host device such as a computer or a smart phone. The storage device may include a memory device for storing data and a memory controller for controlling the memory device. The memory device is classified into a volatile memory device and a nonvolatile memory device.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments of the present disclosure provide a Peripheral Component Interconnect express (PCIe) device for supporting an improved reset operation and an operating method of the PCIe device.

In accordance with an aspect of the present disclosure, there is provided a PCIe device including: a Direct Memory Access (DMA) device including a plurality of functions; and a PCIe interface device configured to perform communication between a host and the DMA device and including a reset operation controller configured to group, when a plurality of reset signals are received from the host, operations, which are the same as one another among reset operations respectively corresponding to the plurality of reset signals, determine a processing order of the reset operations, and perform the reset operations according to the processing order.

In accordance with another aspect of the present disclosure, there is provided a PCIe device including: DMA devices each including a plurality of functions; and a PCIe interface device including a first port and a second port, which are respectively connected to a first host and a second host, and configured to perform communication between the DMA devices by using the first port and the second port, wherein the PCIe interface device further includes a reset operation controller configured to group, when a first reset signal is received from the first host and a second reset signal is received from the second host, reset operations respectively corresponding to the first reset signal and the second reset signal when the reset operations are the same as each other, determine a processing order of the reset operations, and perform the reset operations according to the processing order.

In accordance with still another aspect of the present disclosure, there is provided a method of operating a PCIe device including a DMA device and a PCIe interface device, the method including: grouping, when a plurality of reset signals are received from a host, operations, which are the same as one another among reset operations respectively corresponding to the plurality of reset signals; determining a processing order of the reset operations; and performing the reset operations according to the processing order.

In accordance with still another aspect of the present disclosure, there is provided an operating method of a PCIe interface device, the method including: ignoring, when provided requests include a group of requests directing the same operation, the requests except a request of the highest priority in the group, and performing operations, which are respectively directed by remaining ones other than the ignored ones among the provided requests, according to a descending order of priorities of the remaining requests.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
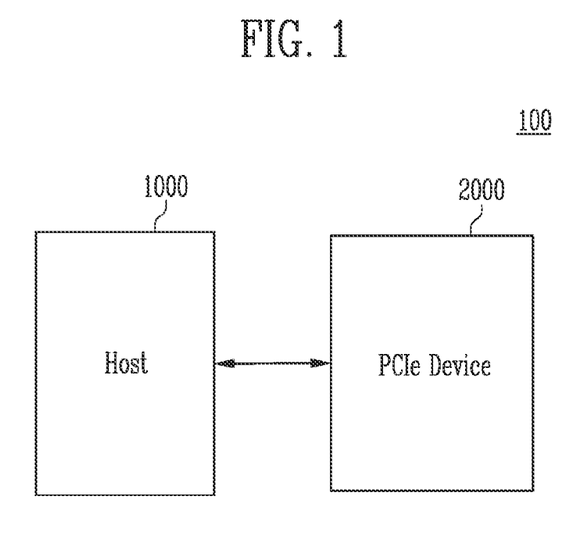
FIG. 1 is a diagram illustrating a computing system in accordance with an embodiment of the present disclosure.

FIG. 1 is a diagram illustrating a computing system in accordance with an embodiment of the present disclosure.

Referring to FIG. 1, the computing system 100 may include a host 1000 and a Peripheral Component Interconnect express (PCIe) device 2000. For example, the computing system 100 may be a mobile phone, a smart phone, an MP3 player, a laptop computer, a desktop computer, a game console, a TV, a tablet PC, an in-vehicle infotainment system, or the like.

The host 1000 may control processing of data and operations of the computing system 100. The host 1000 may store data, commands or program codes, which are necessary for an operation of the computing system 100.

The host 1000 may include an input/output control module for connecting input/output devices to each other. For example, the input/output control module may include a Universal Serial Bus (USB) adaptor, a Peripheral Component Interconnect (PCI) or PCI express (PCIe) adaptor, a Small Computer System Interface (SCSI) adaptor, a Serial AT Attachment (SATA) adaptor, a NonVolatile Memory express (NVMe) adaptor, and the like. The host 1000 may communicate information with devices connected to the computing system 100 through the input/output control module.

PCI is a bus protocol used to connect input/output devices. PCIe is used to define a physical communication layer as a high speed serial interface while having a programming concept defined in the PCI standard.

The PCIe device 2000 may be a device capable of communicating with the host 1000 by using the PCIe. For example, the PCIe device 2000 may be implemented with several I/O device types such as a network and a storage.

In an embodiment, the PCIe device 2000 may be defined as an endpoint or be a device including an endpoint.

The endpoint represents a type of a function which may become a requester or completer of a PCIe transaction. The endpoint is classified into a legacy endpoint, a PCI express (PCIe) endpoint, and a Root Complex integrated EndPoint (RCiEP).

The legacy endpoint may be a function having a type 00 h configuration space header. The legacy endpoint may support a configuration request as a completer. The legacy endpoint may support an I/O request as a completer. The legacy endpoint may accept an I/O request for one or both of positions 80 h and 84 h, regardless of the I/O decode configuration of a corresponding endpoint. The legacy endpoint may generate an I/O request. The legacy endpoint is not to issue a lock request. The legacy endpoint may implement extended configuration space capabilities. It is unnecessary for the legacy endpoint operating as a requester of a memory transaction to generate an address having 4 GB or more. When an interrupt resource is requested, the legacy endpoint is required to support Message Signaled Interrupt (MSI), MSI-X, or both thereof. When the MSI is implemented, the legacy endpoint may support a 32-bit or 64-bit message address version of an MSI functional structure. The legacy endpoint may support 32-bit address specification with respect to a base address register which requests a memory resource. The legacy endpoint may exhibit in one of the hierarchy domains started in a root complex.

The PCIe endpoint may be a function having a type 00 h configuration space header. The PCIe endpoint may support a configuration request as a completer. The PCIe endpoint is not to rely on operating system allocation of an I/O resource requested through a Base Address Register (BAR). The PCIe endpoint may not generate any I/O request. The PCIe endpoint may not support any lock request as a completer or generate any lock request as a requester. A PCIe compatible software driver and an application program may be made such that any lock semantic is not used when the PCIe endpoint is accessed. The PCIe endpoint operating as the requester of the memory transaction may generate an address greater than 4 GB. When an interrupt resource is requested, the PCIe endpoint may be required to support MSI, MSI-X, or both thereof. When the MSI is implemented, the PCIe endpoint may support a 64-bit message address version of the MSI functional structure. A minimum memory address range requested by the base address register may be 128 bytes. The PCIe endpoint may exhibit in one of the hierarchy domains started in the root complex.

The RCiEP may be implemented in an internal logic of the root complex including a root port. The RCiEP may be a function having a type 00 h configuration space header. The RCiEP may support a configuration request as a completer. The RCiEP may not request any I/O resource through the base address register. The RCiEP may not generate any I/O request. The RCiEP may not support any lock request as a completer or generate any lock request as a requester. A PCIe compatible software driver and an application program may be made such that any lock semantic is not used when the RCiEP is accessed. The RCiEP operating as a requester of a memory transaction may generate an address greater than or equal to an address which the host 1000 can process as a completer. When an interrupt resource is requested, the PCIe endpoint may be required to support MSI, MSI-X, or both thereof. When the MSI is implemented, the RCiEP may support a 32-bit or 64-bit message address version of the MSI functional structure. The RCiEP may support 32-bit address specification with respect to a base address register which requests a memory resource. The RCiEP may implement link capability, link state, link control, link capability 2, link state 2, and link control 2 registers in PCIe extended capability. The RCiEP may not implement active state power management. The RCiEP may not be entirely independently hot-plugged with the root complex. The RCiEP may not exhibit in any hierarchy domain exposed by the root complex. The RCiEP may not exhibit in any switch.

In an embodiment, the PCIe device 2000 may generate one or more virtual devices. For example, the PCIe device 2000 may store program codes for generating one or more virtual devices.

In an embodiment, the PCIe device 2000 may generate a Physical Function (PF) device or a Virtual Function (VF) device, based on a virtualization request received from the host 1000. For example, the physical function device may be set as a virtual device in which an access right is given to a virtualization intermediary. The virtual function device may be set as a virtual device allocated to a virtual machine of the host 1000.

Figure 2:
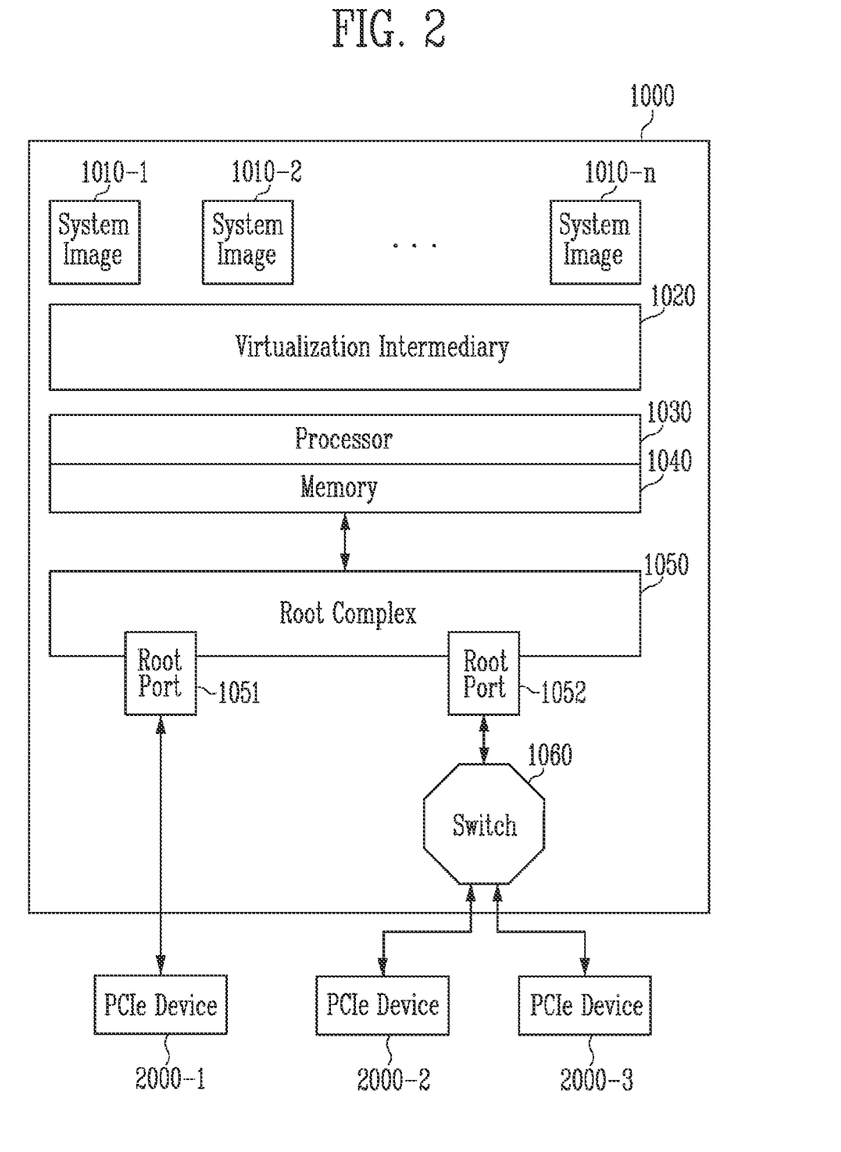
FIG. 2 is a diagram illustrating a host in accordance with an embodiment of the present disclosure.

FIG. 2 is a diagram illustrating a host in accordance with an embodiment of the present disclosure.

Referring to FIG. 2, the host 1000 may include a plurality of system images 1010-1 to 1010-n, a virtualization intermediary 1020, a processor 1030, a memory 1040, a root complex 1050, and a switch 1060.

In an embodiment, a plurality of PCIe devices 2000-1 to 2000-3 may represent the PCIe device 2000 shown in FIG. 1.

The system images 1010-1 to 1010-$n$ may be software components executed in a virtual system capable of being allocated with a PCIe function. In an embodiment, the system images 1010-1 to 1010-$n$ may be designated as a virtual machine. The system images 1010-1 to 1010-$n$ may be software such as applications or operating systems used to execute reliable services. For example, the system images 1010-1 to 1010-$n$ may be configured with a guest operating system (OS), a shared or non-shared I/O device driver, and the like. In order to effectively increase hardware resource utilization, the plurality of system images 1010-1 to 1010-$n$ May be executed in the computing system 100.

In an embodiment, the PCIe function may be an independent operation unit for providing physical resources included in the PCIe devices 2000-1 to 2000-3. In this specification, the PCIe function and a "function" may be used as the same meaning.

The virtualization intermediary 1020 may be a software component for supporting the one or more system images 1010-1 to 1010-$n$. In an embodiment, the virtualization intermediary 1020 may be designated as a hypervisor or a Virtual Machine Monitor (VMM). The virtualization intermediary 1020 may be interposed between the system images 1010-1 to 1010-$n$ and hardware such as the processor 1030 and memory 1040. I/O (inbound or outbound) operations in the computing system 100 may be intercepted and processed by the virtualization intermediary 1020. The virtualization intermediary 1020 may abstract a hardware resource, thereby presenting each of the system images 1010-1 to 1010-$n$, which has its own virtual system. Actual hardware resources available in each of the system images 1010-1 to 1010-$n$ may vary according to workload or customer-specific policies.

The processor 1030 may include a circuit for performing control on processing of data and operations of components of the computing system 100, interfaces or program codes. For example, the processor 1030 may include a CPU, an ARM, an Application Specific Integrated Circuit (ASIC), or the like.

The memory 1040 may include an SRAM, a DRAM, or the like, which stores data, commands or program codes, which are necessary for an operation of the computing system 100. Also, the memory 1040 may include a nonvolatile memory. In an embodiment, the memory 1040 may store program codes for executing one or more operating systems (OSs) and one or more virtual machines (VMs) and program codes for executing a virtualization intermediary (VI) for managing the VMs.

The processor 1030 may execute one or more operating systems and virtual machines by driving the program codes store in the memory 1040. Also, the processor 1030 may execute the virtualization intermediary 1020 for managing virtual machines. In this manner, the processor 1030 may control operations of components of the computing system 100.

The root complex 1050 represents a root of an I/O hierarchy for connecting a processor 1030/memory 1040 sub-system to I/O.

The computing system 100 may include one or more root complexes 1050. In addition, each root complex 1050 may include one or more root ports 1051 and 1052. The root ports 1051 and 1052 represent a separate hierarchy. The root complex 1050 may communicate with the switch 1060 or the PCIe devices 2000-1 to 2000-3.

A function of routing a peer-to-peer transaction between hierarchy domains through the root complex 1050 is an option. The hierarchy domain may be configured as a sub-hierarchy including a single endpoint or one or more switches and one or more endpoints.

The root complex 1050 may divide a packet into packets smaller than the packet when a peer-to-peer transaction is routed between hierarchy domains. For example, the root complex 1050 may divide a single packet having a 256-byte payload into two packets each having a 128-byte payload. By way of exception, the root complex 1050 which supports peer-to-peer routing of a vendor_defined message may divide a vendor_defined message packet into packets smaller than the vendor_defined message packet except a 128-byte boundary (i.e., all result packets except a last packet are to be an integer multiple of 128 bytes).

The root complex 1050 is to support configuration request generation as a requester. The root complex 1050 may support I/O request generation as a requester. The root complex 1050 is not to support lock semantics as a completer. The root complex 1050 may support lock request generation as a requester.

The switch 1060 may be defined as a logical assembly of several virtual PCI-PCI bridge devices. The switch 1060 may communicate with the PCIe devices 2000-2 and 2000-3 connected thereto. The switch 1060 is represented as two or more logical PCI-PCI bridges in configuration software. The switch 1060 may transfer a transaction by a PCI bridge mechanism. The switch 1060 may transfer all types of Transaction Layer Packets (TLPs) between all port sets. The switch 1060 may support a lock request. The switch 1060 may not divide any packet into packets smaller than the packet. Arbitration between ingress ports of the switch 1060 may be implemented by using a round robin or a weighted round robin when a defect occurs in the same virtual channel.

Figure 3:
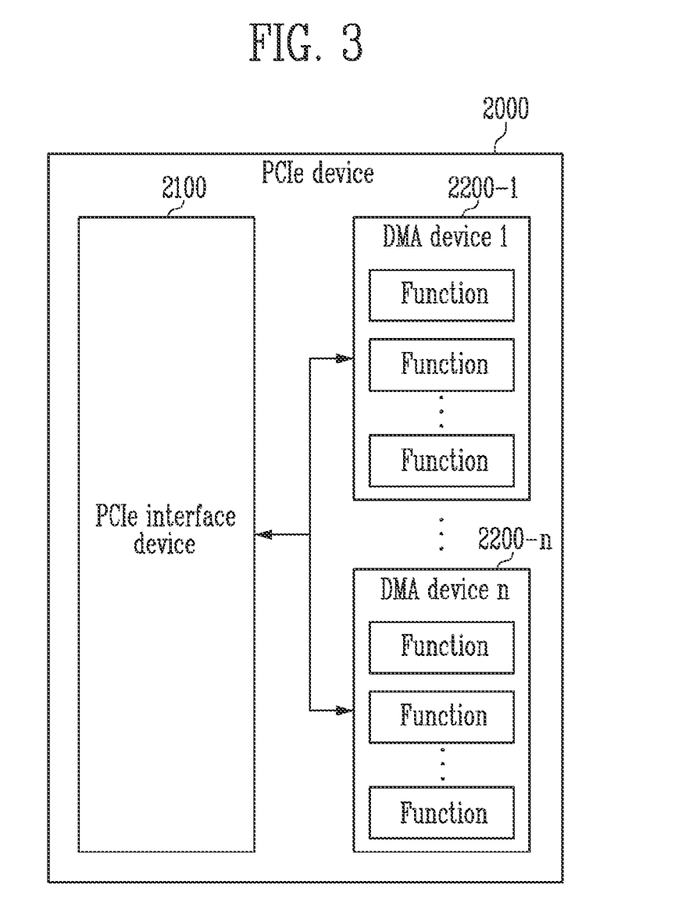
FIG. 3 is a diagram illustrating a configuration of a Peripheral Component Interconnect express (PCIe) device in accordance with an embodiment of the present disclosure.

FIG. 3 is a diagram illustrating a configuration of a PCIe device in accordance with an embodiment of the present disclosure.

Referring to FIG. 3, the PCIe device 2000 may include a PCIe interface device 2100 and Direct Memory Access (DMA) devices 2200-1 to 2200-$n$.

The PCIe interface device 2100 may receive transaction layer packets from a plurality of functions executed in the DMA devices 2200-1 to 2200-$n$. The PCIe interface device 2100 transfers the transaction layer packet received from each of the functions to the host 1000.

Types of the DMA devices 2200-1 to 2200-$n$ may include a Non-Volatile Memory express (NVMe) device, a Solid State Drive (SSD) device, an Artificial Intelligence Central Processing Unit (AI CPU), an Artificial Intelligence System on Chip (AI SoC), an Ethernet device, a sound card, a graphic card, and the like. The types of the DMA devices 2200-1 to 2200-$n$ are not limited thereto, and may include other electronic devices using a PCIe interface. The function may be software or firmware, which is executed in the DMA devices 2200-1 to 2200-$n$ and processes transaction of the transaction layer packet.

The function may be executed for each of the DMA devices 2200-1 to 2200-$n$. For example, the DMA devices 2200-1 to 2200-$n$ may include at least one function. The number of functions executed in the DMA devices 2200-1 to 2200-$n$ may vary in some embodiments. The PCIe device 2000 may generate a physical function or a virtual function according to a virtualization request received from the host 1000. The PCIe device 2000 may allocate functions to each of the DMA devices 2200-1 to 2200-$n$. The number of functions which are allocated to each of the DMA devices 2200-1 to 2200-*n* to be executed may be individually set. Therefore, a plurality of functions may be allocated to each of the DMA devices 2200-1 to 2200-*n*, and each function may be executed as an independent operation unit.

Although a plurality of DMA devices 2200-1 to 2200-*n* have been illustrated in FIG. 3, the DMA devices 2200-1 to 2200-*n* may be implemented as a single device. The DMA devices 2200-1 to 2200-*n* may be implemented in a form in which a plurality of ports are connected to one DMA device to form a plurality of links.

Figure 4:
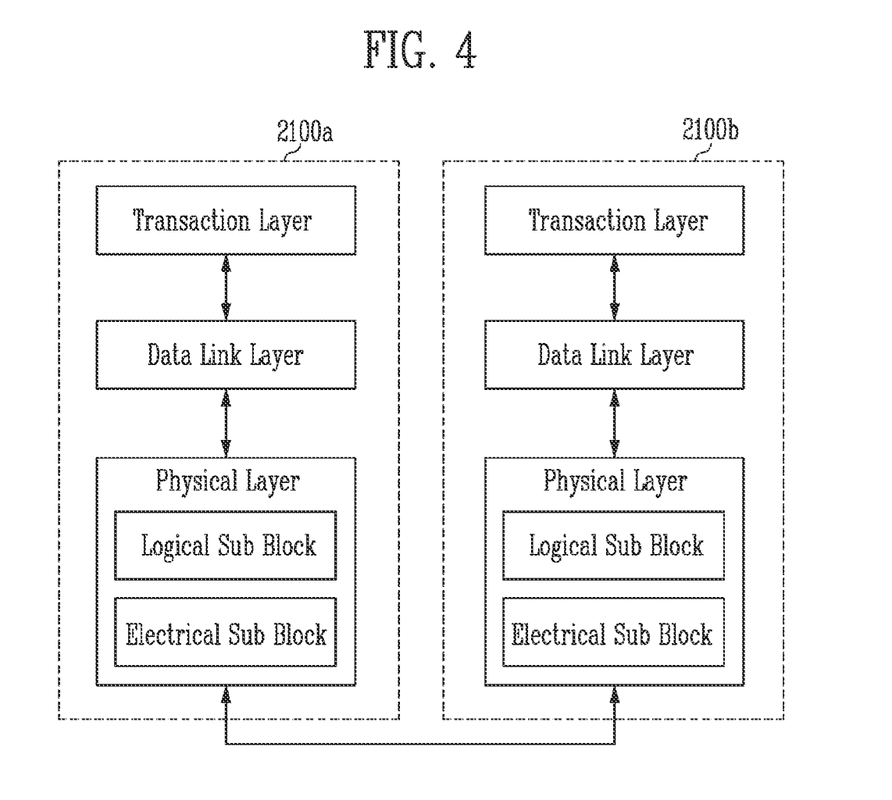
FIG. 4 is a diagram illustrating a structure of layers included in a PCIe interface device in accordance with an embodiment of the present disclosure.

FIG. 4 is a diagram illustrating a structure of layers included in a PCIe interface device in accordance with an embodiment of the present disclosure.

Referring to FIG. 4, a first PCIe interface devices 2100*a* and a second PCIe interface device 2100*b* are illustrated. The first PCIe interface devices 2100*a* and the second PCIe interface device 2100*b* may represent the PCIe interface device 2100 shown in FIG. 3.

PCIe layers included in the PCIe interface devices 2100*a* and 2100*b* may include three discrete layers. For example, the PCIe layers May include a transaction layer, a data link layer, and a physical layer. Each of the layers may include two sections. One section may process outbound (or transmitted) information, and the other section may process inbound (or received) information. In addition, the PCIe interface devices 2100*a* and 2100*b* may use transaction layer packets to communicate information.

The transaction layer may assemble and disassemble transaction layer packets (TLPs). Also, the transaction layer may implement a split transaction, i.e., a transaction which allows another traffic to be transferred through a link while a target system assembles data necessary for a response. In an embodiment, four transaction address spaces may include a configuration address space, a memory address space, an input/output address space, and a message address space. A memory space transaction may include one or more of read and write requests to transfer data to/from a memory-mapped location. In one embodiment, the memory space transaction may use two different address formats, e.g., a short address format, such as a 32-bit address, or a long address format, such as 64-bit address. A configuration space transaction may be used to access a configuration space of a PCIe system. A transaction to the configuration space may include read and write requests. A message space transaction (or message) may be defined to support in-band communication between PCIe systems.

The transaction layer may store link configuration information, and the like. Also, the transaction layer may generate a TLP, or convert a TLP received from the outside into a payload or status information.

The data link layer may perform functions of link management and data integrity including error detection and error correction. Specifically, a transmission side of the data link layer may accept TLPs assembled in the transaction layer, provide a data protection code, and calculate a TLP sequence number. Also, the transmission side of the data link layer May transmit the data protection code and the TLP sequence number to the physical layer such that the data protection code and the TLP sequence number are transmitted through the link. A reception side of the data link layer may check data integrity of TLPs received from the physical layer, and transmit the TLPs to the transaction layer to perform additional processing.

The physical layer may include all circuitry for an interface operation. The all circuitry may include a driver, an input buffer, a serial-to-parallel conversion circuit, a parallel-to-serial conversion circuit, phase locked loops (PLLs), and an impedance matching circuit.

Also, the physical layer may include a logical sub-block and an electrical sub-block, which physically transmit a packet to an external PCIe system. The logical sub-block may perform a role necessary for a 'digital' function of the physical layer. In relation to this, the logical sub-block may include a transmission section for preparing sending information to be transmitted by the physical sub-block and a reception section for identifying and preparing information received before the received information is transferred to the data link layer. The physical layer may include a transmitter and a receiver. The transmitter may be supplied with a symbol transmitted to an external device as the transmitter is serialized by the logical sub-block. In addition, the receiver may be supplied with a serialized symbol from the external device, and convert the received symbol into a bit stream. The bit stream may be deserialized to be supplied to the logical sub-block. That is, the physical layer may convert TLPs received from the data link data into a serialized format, and convert a packet received from the external device into a deserialized format. Also, the physical layer may include logical functions associated with interface initialization and maintenance.

Although the structure of each of the PCIe interface devices 2100*a* and 2100*b* is illustrated in FIG. 4, the structure of each of the PCIe interface devices 2100*a* and 2100*b* may include an arbitrary form such as a quick path interconnect structure, a next generation high performance computing interconnect structure, or another hierarchical structure.

Figure 5:
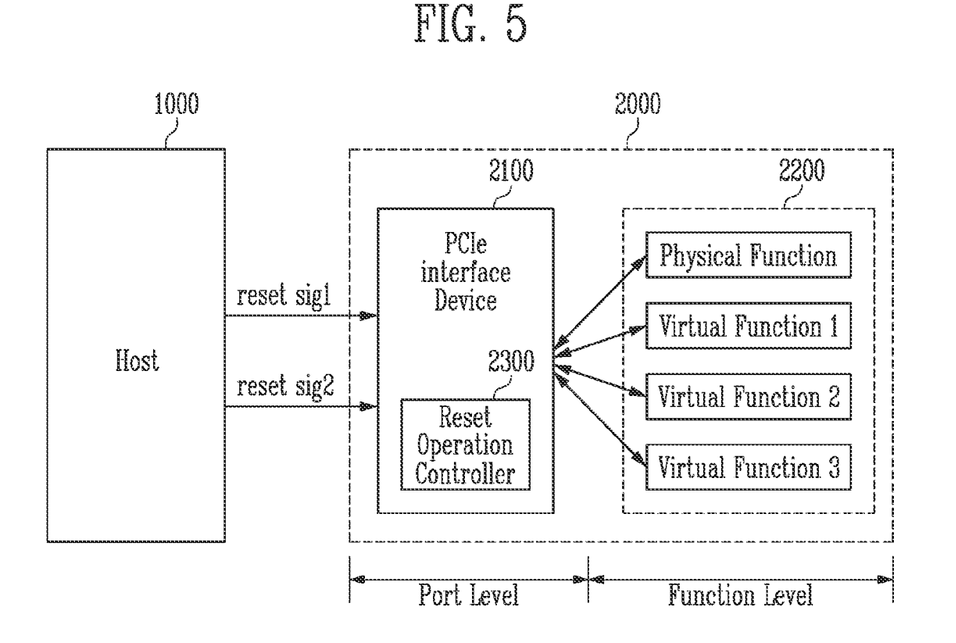
FIG. 5 is a diagram illustrating an operating method of the PCIe device in accordance with an embodiment of the present disclosure.

FIG. 5 is a diagram illustrating an operating method of the PCIe device in accordance with an embodiment of the present disclosure.

Referring to FIG. 5, the PCIe device 2000 may include a PCIe interface device 2100 and a DMA device 2200, the PCIe interface device 2100 may include a reset operation controller 2300, and the DMA device 2200 may include a physical function and a virtual function.

The PCIe interface device 2100 may perform communication between the host 1000 and the DMA device 2200. The PCIe interface device 2100 may transfer a communication packet between the host 1000 and the DMA device 2200. The communication packet may be a transaction layer packet which is received from each function or is transmitted to a plurality of functions.

The reset operation controller 2300 may control the PCIe device 2000 to perform a reset operation. Specifically, when a reset signal is received from the host 1000, the reset operation controller 2300 may control the PCIe device 2000 to perform a reset loop corresponding to the reset signal. The reset signal may be a signal for requesting a parameter or setting value of a component included in the PCIe device 2000 to be reset. In an embodiment, the reset loop may include a plurality of reset operations. The plurality of reset operations may be a series of operations for resetting the parameter or setting value of the component.

In an embodiment, the reset operation may include a fundamental reset including a cold reset, a warm reset, and a hot reset. The cold reset may mean a reset operation performed while supplying power after power supplied to the PCIe device 2000 is interrupted, and the warm reset may be an operation of asserting a value PERST #while maintaining the power supplied to the PCIe device 2000. The hot reset may be an operation of resetting a configured link and an associated downstream device by using an in-band signal.

In a fundamental reset operation, setting values of all port registers and state machines may be set as predetermined initialization values.

In an embodiment, the reset operation may include a recovery operation of resetting a link when a connected link is down or when performance deterioration of the link occurs, a function reset of reallocating a virtual function, and the like, in addition to the fundamental reset operation.

In accordance with an embodiment of the present disclosure, the reset operation controller 2300 may receive a plurality of reset signals from the host 1000, and control the PCIe device 2000 to perform reset operations corresponding to the plurality of reset signals. Conventionally, there was a problem in which the same reset operation was repeatedly performed according to a plurality of reset signals. In an embodiment, the same reset operations may be the same type of reset operations. In an embodiment, when the plurality of reset signals are received, the reset operation controller 2300 may group operations, which are the same as one another among the reset operations, such that the same operation is not repeatedly performed. Also, the reset operation controller 2300 may control the PCIe device 2000 to perform a reset operation according to the plurality of reset signals such that the same operations are not repeatedly performed. That is, the reset operation controller 2300 may control the PCIe device 2000 to perform one of the grouped reset operations without performing remaining operations of the grouped reset operations. For example, the reset operation controller 2300 may ignore, when the provided reset signals include a group of reset signals directing the same reset operation, the reset signals except a reset signal of the highest priority in the group.

In accordance with an embodiment, the reset operation controller 2300 may determine a processing order with respect to reset operations corresponding to a reset signal having a high priority order among the plurality of reset signals. For example, the reset operation controller 2300 may determine a processing order of the reset operations according to a descending order of priorities of the plurality of reset signals. Also, the reset operation controller 2300 may determine whether reset operations corresponding to a reset signal having a low priority have repeatedly performed with respect to the reset operations corresponding to the reset signal having the high priority. For example, the reset operation controller 2300 may determine at least one or more reset operations included in reset operations corresponding to a reset signal having a high priority among reset operations corresponding to a reset signal having a low priority. More specifically, the reset operation controller 2300 may preferentially perform the reset operations corresponding to the reset signal having the high priority, and then control the PCIe device 2000 to perform reset operations which are not performed among the reset operations corresponding to the reset signal having the low priority.

The reset operation controller 2300 may determine that a priority of a reset signal corresponding to a reset operation becomes higher as a logical distance or a physical distance between the host 1000 and the component corresponding to the reset operation becomes shorter. For example, a physical distance between the PCIe interface device 2100 and the host 1000 may be shorter than a physical distance between the host 1000 and the DMA device 2200. In addition, since the DMA device 2200 communicates with the host 1000 through the PCIe interface device 2100, a logical distance between the PCIe interface device 2100 and the host 1000 may be shorter than a logical distance between the host 1000 and the DMA device 2200.

In an embodiment, the reset operation controller 2300 may determine, to have the lowest priority among the plurality of reset signals, a reset signal corresponding to a reset operation of a function level on the plurality of functions. The reset operation having the function level may be an operation of reallocating a virtual function or a reset operation associated with the virtual function.

Also, the reset operation controller 2300 may determine, to have the highest priority, a reset signal corresponding to a reset operation of a port level on a port physically connected to the host 1000. The reset operation having the port level may be associated with connection to the host 1000. For example, the reset operation having the port level may be an operation of increasing or decreasing a plurality of lanes connected to the host 1000, an operation of resetting a link, a hot reset, and the like.

Figure 6:
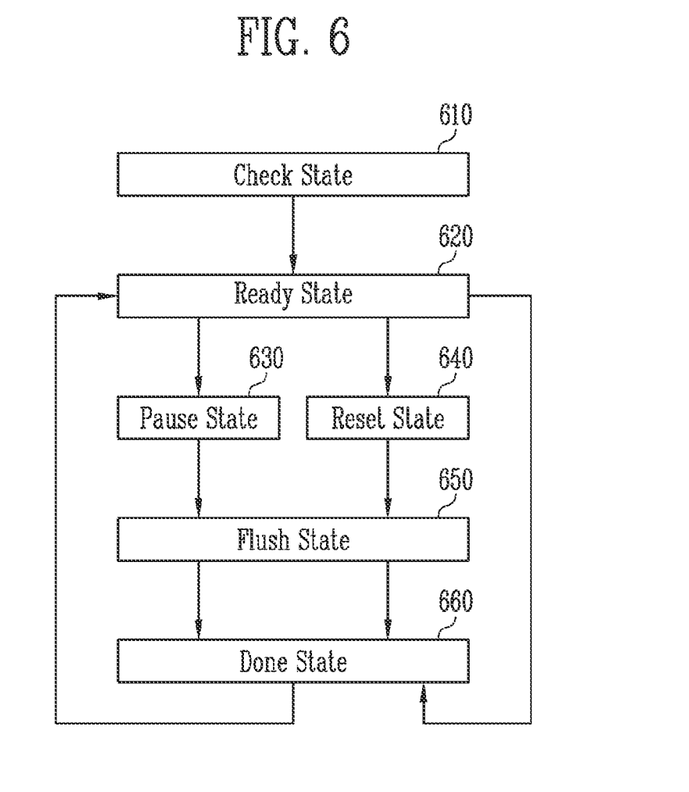
FIG. 6 is a diagram illustrating a process of performing a reset operation in accordance with an embodiment of the present disclosure.

FIG. 6 is a diagram illustrating a process of performing a reset operation in accordance with an embodiment of the present disclosure.

Referring to FIG. 6, the reset operation may include a check state 610, a ready state 620, a pause state 630, a reset state 640, a flush state 650, and a done state 660.

The check state 610 may be a state in which, when a reset signal is received, reset operations are grouped and realigned according to a priority of the reset signal. During the check state 610, the PCIe device may check whether any reset command or any reset signal has been input. In reset signals input to the PCIe device 2000, a reset signal having a high priority and a reset signal having a low priority may be mixed. In addition, when the reset signal having the low priority can be neglected by the reset signal having the high priority, the PCIe device 2000 may delete the reset signal having the low priority. That is, when reset operations corresponding to the reset signal having the high priority includes reset operations corresponding to the reset signal having the low priority, the reset signal having the low priority may be omitted. In an embodiment, when a reset signal having a highest priority is input during a reset operation, the reset operation being performed may be suspended, and the reset signal having the highest priority may be processed.

The ready state 620 may be an initial state of reset operations in which all reset codes are to be started. During the ready state 620, the PCIe device 2000 may check types of reset operations corresponding to a reset signal received in the ready state 620, and proceed to a next state.

The pause state 630 is a state after the ready state 620, and may be a state in which some reset operations are temporarily paused according to the priority of the reset signal. In addition, the reset state 640 is a state after the ready state 620, and may be a state in which some reset operations are performed according to the priority of the reset signal. Specifically, in the reset state 640, an active command is suspended during reset operations, and queue deletion, setting for an initialization module to be reset, deletion of a register, and the like may be performed.

In the flush state 650, the PCIe device 2000 may check whether any active command exists, and then flush data when any active command does not exist. During the flush state 650, the PCIe device 2000 may store meta data and clear a bitmap.

The done state 660 may be a last state of the reset operation.

During the done state 660, the PCIe device 2000 may check whether all flush commands have been executed, initialize a control register, and perform a reset operation of setting the corresponding register.

In each state shown in FIG. 6, reset operations corresponding to the reset signal may be performed, and the PCIe device 2000 may perform a reset operation in each state according to a determined processing order.

Figure 7:
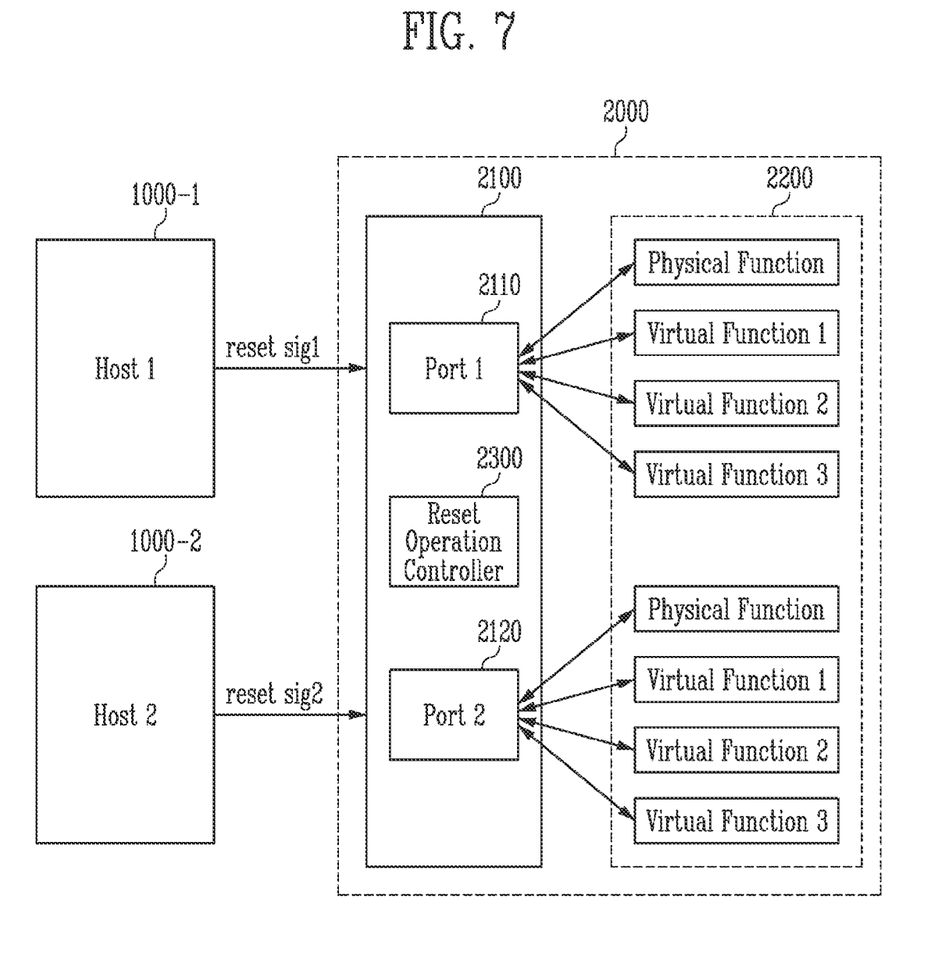
FIG. 7 is a diagram illustrating a case of receiving a reset signal from a plurality of hosts in accordance with an embodiment of the present disclosure.

FIG. 7 is a diagram illustrating a case of receiving a reset signal from a plurality of hosts in accordance with an embodiment of the present disclosure.

Referring to FIG. 7, the PCIe device may be configured with a multi-port including a first port 2110 and a second port 2120. Also, the PCIe device 2000 may perform communication with a first host 1000-1 by using the first port 2110, and perform communication with a second host 1000-2 by using the second port 2120.

In an embodiment, the reset operation controller 2300 may control the PCIe device 2000 to perform a reset operation. Specifically, when a first reset signal is received from the first host 1000-1, the reset operation controller 2300 may control the PCIe device 2000 to perform reset operations corresponding to the first reset signal. Also, when a second reset signal is received from the second host 1000-2, the reset operation controller 2300 may control the PCIe device 2000 to perform reset operations corresponding to the second reset signal. Each of the first reset signal and the second reset signal may be a signal for requesting a parameter or setting value of a component to be reset.

In accordance with an embodiment of the present disclosure, when the reset operation controller 2300 receives the first rest signal from the first host 1000-1 and receives the second reset signal from the second host 1000-2, the reset operation controller 2300 may group operations, which are the same as one another among the reset operations corresponding to the first reset signal and the second reset signal. The reset operation controller 2300 may group the same operations among the reset operations such that the same operation is not repeatedly performed. Also, the reset operation controller 2300 may control the grouped operations to be performed only once.

In accordance with an embodiment, the reset operation controller 2300 may determine a processing order with respect to reset operations corresponding to a reset signal having a high priority order, which is selected from the first reset signal and the second reset signal. For example, the reset operation controller 2300 may determine a processing order of the reset operations according to a descending order of priorities of the first reset signal and the second reset signal. Also, the reset operation controller 2300 may determine whether reset operations corresponding to a reset signal having a low priority have repeatedly performed with respect to the reset operations corresponding to the reset signal having the high priority. For example, the reset operation controller 2300 may determine at least one or more reset operations, which are included in reset operations corresponding to a reset signal having a high priority among the first and second reset signals, among reset operations corresponding to a reset signal having a low priority among the first and second reset signals. More specifically, the reset operation controller 2300 may preferentially perform the reset operations corresponding to the reset signal having the high priority, and then control the PCIe device 2000 to perform reset operations which are not performed among the reset operations corresponding to the reset signal having the low priority.

The reset operation controller 2300 may determine that a priority of a reset signal corresponding to a reset operation becomes higher as a logical distance or a physical distance between the first host 1000-1 or the second host 1000-2 and the component corresponding to the reset operation becomes shorter. For example, a physical distance between the PCIe interface device 2100 and the first host 1000-1 or the second host 1000-2 may be shorter than a physical distance between the DMA device 2200 and the first host 1000-1 or the second host 1000-2. In addition, since the DMA device 2200 communicates with the first host 1000-1 or the second host 1000-2 through the PCIe interface device 2100, a logical distance between the PCIe interface device 2100 and the first host 1000-1 or the second host 1000-2 may be shorter than a logical distance between the first host 1000-1 or the second host 1000-2 and the DMA device 2200.

Figure 8:
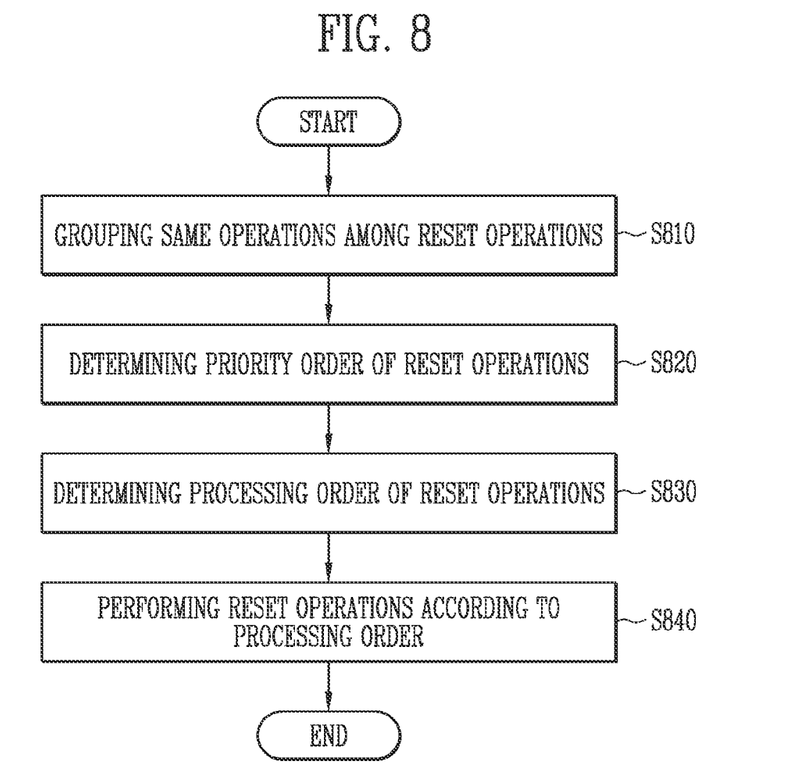
FIG. 8 is a flowchart illustrating an operating method of the PCIe device in accordance with an embodiment of the present disclosure.

FIG. 8 is a flowchart illustrating an operating method of the PCIe device in accordance with an embodiment of the present disclosure.

Referring to FIG. 8, an operating method of the PCIe device 2000 including a DMA device and a PCIe interface device is illustrated.

The PCIe device 2000 may receive a plurality of reset signals from the host 1000. The PCIe device 2000 may group operations, which are the same as one another among reset operations respectively corresponding to a plurality reset signals (S810). The reset signal may be a signal for requesting a register or setting value of a corresponding component to be reset as a predetermined initialization value, and a plurality of reset operations may be performed according to the reset signal.

Also, the PCIe device 2000 may determine priorities of the reset operations (S820). Specifically, the PCIe device 2000 may determine that a priority of a component corresponding to each of the reset signals or the reset operations becomes higher as a logical distance or a physical distance between the host and the component becomes shorter. In an embodiment, the PCIe device 2000 may group reset operations corresponding to a reset signal having a low priority with respect to reset operations corresponding to a reset signal having a high reset signal.

The PCIe device 2000 may determine a processing order of reset operations corresponding to the plurality of reset signals received from the host 1000 (S830). Specifically, the PCIe device 2000 may determine the processing order with respect to reset operations corresponding to a reset signal having a high priority order among the plurality of reset signals. For example, the PCIe device 2000 may determine the processing order according to a descending order of priorities of the plurality of reset signals. In an embodiment, the PCIe device 2000 may determine a processing order of reset operations including the grouped operations. The PCIe device 2000 may group the same reset operations such that one of the grouped reset operations is to be performed without performing remaining operations of the grouped reset operations, and a processing order of the reset operations including the grouped operations may be determined.

Also, the PCIe device 2000 may perform the reset operations according to the determined processing order (S840). The PCIe device 2000 may perform the same reset operation only once such that the same reset operation is not repeatedly performed.

In accordance with the present disclosure, there can be provided a PCIe device for supporting an improved reset operation and an operating method of the PCIe device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Furthermore, the embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein, and the following claims. Furthermore, the embodiments may be combined to form additional embodiments.

What is claimed is:

1. A Peripheral Component Interconnect express (PCIe) device comprising:
    a Direct Memory Access (DMA) device including a plurality of functions; and
    a PCIe interface device configured to perform communication between a host and the DMA device and including a reset operation controller configured to:
    group, when a plurality of reset signals are received from the host, reset operations, which are the same type as other of the reset operations corresponding to other of the plurality of reset signals received from the host, determine a processing order of the reset operations, and perform the reset operations according to the processing order,
    wherein the grouped reset operations comprise a first reset operation, which is included in reset operations corresponding to a first reset signal having a high priority among the plurality of reset signals, and a second reset operation, which is the same type as the first reset operation and included in reset operations corresponding to a second reset signal having a low priority among the plurality of reset signals, and
    wherein the reset operation controller:
    performs the reset operations, which include the first reset operation, corresponding to the first reset signal; and
    performs reset operations excluding the second reset operation among the reset operations corresponding to the second reset signal, after performing the reset operations corresponding to the first reset signal.

2. The PCIe device of claim 1, wherein the reset operation controller performs one of the grouped reset operations without performing remaining operations of the grouped reset operations.

3. The PCIe device of claim 1, wherein the reset operation controller determines the processing order according to a descending order of priorities of the plurality of reset signals.

4. The PCIe device of claim 3, wherein the reset operation controller determines the processing order by determining at least one or more reset operations included in the reset operations corresponding to the first reset signal among the reset operations corresponding to the second reset signal.

5. The PCIe device of claim 3, wherein the reset operation controller determines the processing order by determining that a priority of a reset signal corresponding to a reset operation becomes higher as a logical distance or a physical distance between the host and a component, which is included in the PCIe device, corresponding to the reset operation becomes shorter.

6. The PCIe device of claim 5, wherein the reset operation controller determines the processing order by determining a reset signal corresponding to a reset operation of a function level on the plurality of functions to have a lowest priority among the plurality of reset signals.

7. The PCIe device of claim 5, wherein the reset operation controller determines the processing order by further determining a reset signal corresponding to a reset operation of a port level on a port physically connected to the host to have a highest priority among the plurality of reset signals.

8. A Peripheral Component Interconnect express (PCIe) device comprising:
    Direct Memory Access (DMA) devices each including a plurality of functions; and
    a PCIe interface device including a first port and a second port, which are respectively connected to a first host and a second host, and configured to perform communication between the DMA devices by using the first port and the second port,
    wherein the PCIe interface device further includes a reset operation controller configured to group, when a first reset signal is received from the first host and a second reset signal is received from the second host, reset operations, which are the same type as other of the reset operations corresponding to the first reset signal and the second reset signal received respectively from the first host and the second host, determine a processing order of the reset operations, and perform the reset operations according to the processing order,
    wherein the grouped reset operations comprise a first reset operation, which is included in the reset operations corresponding to the first reset signal, and a second reset operation, which is the same type as the first reset operation and included in the reset operations corresponding to the second reset signal, and
    wherein the reset operation controller:
    performs the reset operations, which include the first reset operation, corresponding to the first reset signal; and
    performs reset operations excluding the second reset operation among the reset operations corresponding to the second reset signal, after performing the reset operations corresponding to the first reset signal.

9. The PCIe device of claim 8, wherein the reset operation controller performs one of the grouped reset operations without performing the other operations of the grouped reset operations.

10. The PCIe device of claim 8, wherein the reset operation controller determines the processing order according to a descending order of priorities of the first reset signal and the second reset signal.

11. The PCIe device of claim 10, wherein the reset operation controller determines the processing order by determining at least one or more reset operations, which are included in the reset operations corresponding to first reset signal, among the reset operations corresponding to the second reset signal.

12. The PCIe device of claim 10, wherein the reset operation controller determines the processing order by determining that a priority of a reset signal corresponding to a reset operation becomes higher as a logical distance or a physical distance between a host and a component, which is included in the PCIe device, corresponding to the reset operation becomes shorter.

13. The PCIe device of claim 12, wherein the reset operation controller determines the processing order by determining a reset signal corresponding to a reset operation of a function level on the plurality of functions to have a low priority among the first and second reset signals.

14. The PCIe device of claim 12, wherein the reset operation controller determines the processing order by determining a reset signal corresponding to a reset operation of a port level on the first and second ports to have a high priority among the first and second reset signals.

15. A method of operating a Peripheral Component Interconnect express (PCIe) device including a Direct Memory Access (DMA) device and a PCIe interface device, the method comprising:
grouping, when a plurality of reset signals are received from a host, reset operations, which are the same type as other of the reset operations corresponding to other of the plurality of reset signals received from the host;
determining a processing order of the reset operations; and
performing the reset operations according to the processing order,
wherein the grouped reset operations comprise a first reset operation, which is included in reset operations corresponding to a first reset signal, and a second reset operation, which is the same type as the first reset operation and included in reset operations corresponding to a second reset signal, and
wherein the performing of the reset operations according to the processing order includes:
performing the reset operations, which includes the first reset operation, corresponding to the first reset signal; and
performing reset operations excluding the second reset operation among the reset operations corresponding to the second reset signal.

16. The method of claim 15, wherein the performing of the reset operations includes performing one of the grouped reset operations without performing remaining operations of the grouped reset operations.

17. The method of claim 15, wherein the processing order is determined according to a descending order of priorities of the plurality of reset signals.

18. The method of claim 17, wherein the grouping includes grouping the reset operations, which are the same as one another, with respect to the reset operations corresponding to the reset signals having high priorities.

19. The method of claim 17, wherein the determining of the processing order includes determining that a priority of a reset signal corresponding to a reset operation becomes higher as a logical distance or a physical distance between the host and a component, which is included in the PCIe device, corresponding to the reset operation becomes shorter.

* * * * *